United States Patent [19]

Staniland et al.

[11] Patent Number: 4,904,532
[45] Date of Patent: Feb. 27, 1990

[54] LAMINATES OF POLYETHER KETONES AND CARBON FIBERS

[75] Inventors: Philip A. Staniland, Middlesbrough; Roger M. Turner, Whitby; Frederick N. Cogswell, Guisborough, all of England

[73] Assignee: Imperial Chemical Industries PLC, London, England

[21] Appl. No.: 173,026

[22] Filed: Mar. 28, 1988

Related U.S. Application Data

[63] Continuation of Ser. No. 933,614, Nov. 21, 1986, abandoned.

[30] Foreign Application Priority Data

Dec. 5, 1985 [GB] United Kingdom ............... 8530023

[51] Int. Cl.$^4$ .............................................. B32B 27/20
[52] U.S. Cl. ..................................... 428/408; 428/524; 524/540; 524/542; 524/592
[58] Field of Search ................. 524/542, 540, 592; 428/408, 524

[56] References Cited

U.S. PATENT DOCUMENTS

| | | | |
|---|---|---|---|
| 3,953,400 | 4/1976 | Dahl | 528/179 |
| 4,320,224 | 3/1982 | Rose et la. | 528/125 |
| 4,339,568 | 7/1982 | Maresca | 528/126 |
| 4,360,630 | 11/1982 | Smith | 524/592 |
| 4,717,761 | 1/1988 | Staniland | 528/125 |
| 4,766,197 | 8/1988 | Clendinning et al. | 528/126 |

FOREIGN PATENT DOCUMENTS 0125816  11/1984  European Pat. Off. .

OTHER PUBLICATIONS

*Synthesis and Properties of Polyaryletherketones*, T. E. Atwood, P. C. Dawson, J. L. Freeman, L. R. J. Hoy, J. B. Rose and P. A. Staniland, 22 Polymer 1096 (Aug. 1981).

Primary Examiner—John C. Bleutge
Assistant Examiner—DAvid W. Woodward
Attorney, Agent, or Firm—Cushman, Darby & Cushman

[57] ABSTRACT

A new polymer composition comprises an aromatic polyetherketone or mixture thereof containing the repeating units $$-O-Ph-O-Ph-CO-Ph-  \quad\quad I$$

and $$-O-Ph-Ph-O-Ph-CO-Ph-  \quad\quad II$$

(where Ph is phenylene) in the relative molar proportions I:II of 95:5 to 60:40 and 5–80% w/w of a fibrous reinforcing agent. It is suitable for producing shaped articles of high damage tolerance by hot fabrication followed by slow cooling.

6 Claims, No Drawings

LAMINATES OF POLYETHER KETONES AND CARBON FIBERS

This is a continuation of application Ser. No. 933,614, filed Nov. 21, 1986, now abandoned.

The present invention relates to polymer compositions and in particular to such compositions in which the polymer is a polyetherketone which contains a fibrous reinforcing agent.

Many polyetherketones are crystalline and have good resistance to many chemical environments, their melting point is high and they are resistant to burning and burn with only a low emission of smoke and a low proportion of toxic fumes. In EP-A-No. 1879 there is described a tough crystalline polyetherketone having the repeating unit —O—Ph—O—Ph—CO—Ph—, where Ph is para-phenylene, and having an inherent viscosity of at least 0.7. In EP-A No. 31198 there is described a composition comprising a polymer containing that unit and a glass fibre and/or carbon fibre reinforcing agent. Such compositions and variations thereon can be obtained by procedures described in EP-A Nos. 56703, 102158, 102159 and 125816. They can be formed into articles which have a desirable combination of properties including good mechanical impact resistance.

To obtain high rigidity, the composition may be formed into a thick article, particularly 5 mm or more thick, under pressure and at an elevated temperature, then allowed to cool. The rate of cooling is dependent on the size, including the thickness, of the article, the larger articles cooling more slowly. In an autoclave the rate of cooling may be very slow, for example about 0.5° C. per minute. The rate of cooling influences properties of the final article; for example the damage tolerance of faster cooled articles can be superior to that of slower cooled articles.

We have now found that by using a composition based on a particular copolymer, a shaped article can be obtained which has substantial damage tolerance even when slow cooled.

The invention provides a polymer composition comprising component (a) which is an aromatic polyketone or mixture of aromatic polyketones and component (b) which is a fibrous reinforcing agent characterised in that said polyketone or mixture of polyketones is a polyetherketone or mixture of polyetherketones and contains the repeating units

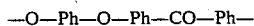   I and

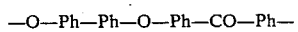   II in the relative molar proportions I:II of 95:5 to 60:40; and in that 5 to 80% by weight calculated on the total of (a) and (b) of a fibrous reinforcing agent, is present.

If component (a) is a mixture of polyketones, it consists preferably of two polyketones, one containing only units I and units II, and the other containing both units I and units II in the relative molar proportions I:II of 95:5 to 60:40. Thus the mixture may for example contain 50% molar of a polyketone containing only units I and 50% molar of a polyketone containing the units I and II in the relative molar proportions 50:50. However, it is preferred to use a mixture of a polyketone containing only units I and a polyketone containing units I and II in the relative molar proportions I:II of 95:5 to 60:40: the polyketone containing units I only should preferably then not amount to more than 20 w/w of the total polyketone.

We have obtained useful results when component (a) is a single polyketone.

Preferably the polyketone or mixture has a melt viscosity (MV) of at least 0.06 kN s m$^{-2}$. The MV of the polyketone or mixture is measured either (A) using a ram extruder fitted with a 3.175 mm×0.5 mm die and operating at 400° at a shear rate of 1000 s$^{-1}$, or (B) (for polyketones and mixtures having a low MV, that is below about 0.10), using the technique of ASTM Test Method D1238-7 with a grader having a 1.181 mm diameter die operating at 380° C. with a load of 2.16 kg. Particularly the polyketone or mixture has an MV of at least 0.08 kN s m$^{-2}$. For ease of processing, the MV of the polyketone or mixture preferably does not exceed 1.5 kN s m$^{-2}$ and especially does not exceed 1.0 kN s m$^{-2}$. For the production of compositions using the procedures of EP-A Nos. 56703, 102158 and 102159, the MV of the polyketone or mixture preferably does not exceed 0.5 kN s m$^{-2}$ and particularly is less than 0.20, for example in the range 0.10 to 0.15, kN s m$^{-2}$. However, using other procedures, as discussed in more detail hereafter, higher MV polyketone or mixture may be preferred.

The polyketone or mixture preferably contains units I and II in the molar proportion I:II of from 95:5 to 70:30.

The fibrous reinforcing agent can be an organic or inorganic for example poly-paraphenylene terephthalamide fibre, glass fibre or, preferably, carbon fibre. The composition preferably contains at least 20% by weight of fibrous reinforcing agent but using (as is preferred) a continuous fibrous material, for example of glass or carbon, it especially contains 30 to 70, more especially 50 to 70, % by volume thereof.

The composition may also contain one or more other materials, for example organic and inorganic fillers such as polytetrafluoroethylene, graphite, boron nitride, mica, talc and vermiculite; nucleating agents; and stabilisers such as phosphates. The total proportion of additives, including the fibrous reinforcing agent, should be such that the composition contains at least 20% by volume of the polyketone or mixture.

The composition may be made by mixing the polyketone or mixture with the fibrous reinforcing agent and with, if required, the said other materials, for example by particle or melt blending.

More specifically the polyketones or mixture, in the form of a dry powder or granules, can be mixed with the fibrous reinforcing agent and, if required, the said other materials, using a technique such as tumble blending or high speed mixing. The blend thus obtained may be extruded into a lace and chopped to give granules. The granules can be subjected to a forming operation, for example injection moulding or extrusion, to give a shaped article.

Alternatively the composition may be obtained by passing the fibrous reinforcing agent as an essentially continuous fibre, for example of glass or carbon, into contact with a melt formed from or containing the the polyketone or mixture. The composition obtained as filaments and/or fibre impregnated with the polyketone or mixture may be used alone or together with other materials, for example a further quantity of the same or a different polyketone or mixture, to form an article by an appropriate shaping technique. The production of compositions by this technique is described in more detail in EP-A Nos. 56703; 102158 and 102159.

In the process of shaping the composition including any annealing stage the crystallinity of the polyketone should be developed as far as possible. This is important because otherwise crystallisation could continue during subsequent use of an article result in dimensional changes, warping or cracking and general change in physical properties. Furthermore, increased crystallinity results in improved environmental resistance and modulus.

To achieve improved crystallisation behaviour, the polyketone or mixture, which is component (a) of the composition, may be modified by forming, on the polymeric chains, terminal ionic groups —A—X, where A is an anion and X is a metal cation. The production of modified polymers containing terminal ionic groups is described in more detail in our EP-A-No. 152161.

The anion is preferably selected from sulphonate, carboxylate, sulphinate, phosphonate, phosphate, phenate and thiophenate and the metal cation is an alkali metal or alkaline earth metal.

By such modification the temperature for the onset of crystallisation (Tc) may be raised by at least 2° C. in comparison with a similar polymer not containing the ionic end-groups. However, useful compositions are obtained even when there is little or no change in Tc if sufficient nucleation results from the presence of end groups to increase the number of spherulites in comparison with a similar composition not containing the ionic end groups.

Such modified polyketones are most suitably produced by reaction of a preformed polyketone with reactive species containing the ionic group. They may be used alone or blended with unmodified polyketone to form the composition.

Each polyketone in component (a) of the composition of the invention can be prepared by an electrophilic process but is conveniently prepared by a nucleophilic process.

Nucleophilic processes for preparing the polyketones are described, inter alia, in GB-A-Nos. 1078234, 1153053, 1414421, 1563223, 1569603 and 1586972 and Canadian No. 847963. Polyketones containing repeating units I and the preparation thereof are described in EP-A No. 1879. Polyketones containing repeating units I and II are the subject of our EP-A No. 184458 taking priority from GB Application No. 8430669, filed Dec. 5, 1984 and entitled "Thermoplastic Aromatic Polyetherketones".

The polyketone containing units I and II can be prepared by polycondensing a mixture of hydroquinone and 4,4'-dihydroxybiphenyl with a 4,4'-dihalobenzophenone, preferably 4,4'-difluorobenzophenone, preferably in the presence of an alkali metal carbonate or bicarbonate and of a solvent such as diphenylsulphone or a substituted derivative thereof. The temperature of the polycondensation is conveniently in the range 150° to 400° C., preferably with a final temperature in the range 280° to 320° C.

The fibrous reinforcing agent impregnated with the polyketone or mixture can be laminated by the application of heat and pressure, for example by compression moulding or by a pair of heated rollers. The temperature is above the melting point of the polyketone, conveniently at at least 350° C. and typically at about 400° C. The pressure is in particular at least 0.1 MN/m$^2$. When producing small mouldings by matched die forming, a pressure of at least 5 MN/m$^2$ is desirable.

Once the laminate has been formed, it is cooled. Whereas in general it appears that a laminate cooled quickly, (at least 10° C. per minute), has a damage tolerance greater than if cooled slowly, (up to 5, particularly up to 1° C. per minute), a laminate formed from the composition of the invention and slow cooled has substantial damage tolerance, higher than slowly cooled laminate of polyketone containing units I only. For example a slow cooled laminate of a polymer composition of the invention using carbon fibre can retain considerable strength even after being subjected to an impact of 4.5 J/mm (1000 in lb/in).

Thus according to a further aspect of the invention there is provided a multi-ply quasi-isotropic laminate in which the reinforcing agent is carbon fibre and which has a residual compression strength of at least 290 MN/m$^2$, and preferably at least 300 MN/m$^2$, after being subjected to an impact of 4.5 J/mm. Such a laminate can be formed from the polyketone and carbon fibre by steps including cooling at a rate of not more than 5° C. per minute. Preferred laminates have satisfactory residual compression strength, for example of at least 220 MN/m$^2$, preferably at least 235 MN/m$^2$ and especially at least 240 MN/m$^2$, after being subjected to an impact of 6.7 J/mm (1500 in lb/in) or an impact of 8.9 J/mm (2000 in lb/in).

The multi-ply laminate comprises an assembly of plies (also referred to as layers) in each of which the fibres are oriented at an angle, conveniently 45° as in most quasi-isotropic laminates but possibly for example 30° or 60° or 90° or intermediately, to those in the plies above and below. Suitable laminates contain at least 4 preferably at least 8 plies. The number of plies is dependent on the intended use, for example the strength required, and laminates containing 32 plies or even more, for example several hundred, may be desirable. The residual compression strength of the laminate is determined, after subjecting it to impact, using the technique described by B A Byers in NASA Contractor Report No. 159293 of August 1980. Each ply is typically in the form of a tape of many impregnated fibres and/or filaments fused together.

Whereas the laminate may be slow cooled under pressure, for example overnight from 400° C. at 0.5° C./minute, and will have good damage tolerance, slow cooling is not essential and faster cooling may be used, for example over 10° C./minute.

Further details of the invention are set out by way of illustration in the following examples.

EXAMPLE 1

Preparation of polyketone 4,4'-difluorobenzophenone (61.2 kg, 0.28 mole), hydroquinone (28.766 kg, 0.26 mole), 4,4'-dihydroxybiphenyl (2.564 kg, 0.137 mole) and diphenylsulphone (124 kg) were charged to a 0.4 m$^3$ stainless steel reactor equipped with a stirrer, nitrogen inlet and vent. These materials were heated for ten minutes with stirring, at a temperature of 120° to 125° C. to form a solution. Whilst maintaining a nitrogen blanket, anhydrous sodium carbonate (30.25 kg) and anhydrous potassium carbonate (0.760 kg) (both sieved through a screen with a mesh size of 500 micrometers) were added at a temperature of 125° C. Whilst continuing to stir, the temperature was raised to 175° C. and maintained there for two hours.

The temperature was then raised to 200° C. and maintained there for 0.5 hour. Finally the temperature was raised to 300° C. and maintained there for 2 hours, the resulting polymer being in solution at this stage. The mixture was then cooled by casting into a sheet. The resulting solid was milled using a hammer mill, so as to pass through a screen with a mesh size of 850 micrometers. Diphenylsulphone and inorganic salts were removed by washing successively, at ambient temperature, with acetone and water.

The resulting solid polymer was dried at 140° C. in an air oven. It consisted of the repeat units —O—Ph—O—Ph—CO—Ph—        I and —O—Ph—Ph—O—Ph—CO—Ph—        II in the molar proportions I:II 95:5. It had a molecular weight corresponding to a melt viscosity of 0.13 kN s $m^{-2}$, as measured by method A above.

Formation of polymer composition as tape

The polymer was dry blended with diphenylsulphone by tumbling together in a closed container in a 1:1 weight ratio.

The mixture thus prepared was used to impregnate continuous carbon fibres according to the following procedure, which is described in EP-A No. 56703.

25 collimated tows of continuous carbon fibres ("Magnamite" AS-4 supplied by Hercules Inc of Delaware, USA), each tow containing about 12,000 individual fibres (filaments) were drawn at a rate of 300 mm/minute over a series of stationary guide bars to provide a band of width about 150 mm having a tension of about 50 kg. When the fibres had been guided into contiguous relationship they were pulled over a series of 4 fixed heated cylindrical bars of 12.6 mm diameter maintained at 390° C. The powder mixture of polymer and diphenyl sulphone was fed to the nip formed between the carbon fibre band and the first fixed cylindrical bar. The powder melted rapidly to provide a melt pool in the nip which impregnated the fibre band passing over the bar. The structure was passed over and under the three further heated bars without the addition of further of the polymer mixture. Provision was made for extracting the fumes of diphenyl sulphone which were evolved. The product obtained was a continuous tape, 150 mm wide and about 0.125 mm thick containing 60% by volume of the carbon fibre which had been well wetted by the polymer.

EXAMPLE 2

The procedure of Example 1 was repeated with the following changes:

(a) the polyketone was prepared using 60.754 kg of 4,4'-difluorobenzophenone. After maintaining the reaction mixture at 300° C. for two hours, the reaction was end-stopped before cooling. The polyketone obtained had a molecular weight corresponding to a melt viscosity of 0.38 kN s $m^{-2}$ as measured by method A above.

(b) the composition was a blend of that polymer and diphenylsulphone in a 1:2 weight ratio.

EXAMPLE 3

Laminates formation

Sections cut from the impregnated tapes of Example 1 or Example 2 were laminated together by compression moulding at 400° C. for five minutes at an applied pressure of 10 $MN/m^2$, then cooled at different rates. Some were cooled to about 80° C. in the press and under pressure, using air and then water, to give a rate of about 15° C. per minute. Others were allowed to cool overnight in the press without applied cooling, to give a rate of about 0.5° C. per minute.

The following laminates were formed:

(1) 16 thicknesses of the impregnated tape of Example 1 were laid up to give uniaxial alignment of the carbon fibre in a laminate of thickness about 2 mm. This laminate was cooled at about 15° C. per minute to about 80° C. and subjected to mechanical testing. The following results were obtained.

Flexural strength (a) 2162 $MN/m^2$.
Transverse flexural strength (b) 114 $MN/m^2$.
Short beam shear strength (c) 93 $MN/m^2$.

(a) Flexural strength is determined by the technique of ASTM Test Method D790-80, using a 100 mm span.
(b) Transverse flexural strength is determined by the technique of ASTM Test Method D790-80, using a 40 mm span.
(c) Short beam shear strength is determined by the technique of ASTM Test Method D2344-72, using a span to sample thickness ratio of 5:1.

(2) 16 thicknesses of the impregnated tape of Example 1 were laid up such that the carbon fibres in each layer were oriented at 45° to the carbon fibres in the adjacent layers above and below. These laminates were cooled using both cooling procedures described herein.

Samples of the laminates and of a control "APC" were subjected to various impacts and an ultrasonic method was used to determine the area of damage (delamination) caused by the impact. The results are set out in Table One. It appear that slow cooled laminates according to the invention is substantially equivalent to the control.

TABLE ONE

| Impact Energy (d) (J) | Damage Area ($cm^2$) | | | | |
|---|---|---|---|---|---|
| | Standard Cooled (e) | | | Slow cooled (f) | |
| | Invention | | | Invention | |
| | Ex 1 | Ex 2 | Control | Ex 1 | Ex 2 |
| 4 | 1.6 | 1.6 | 2.0 | 2.4 | 2.0 |
| 7 | 2.5 | 1.9 | 4.2 | 3.6 | 2.7 |
| 10 | 4.6 | 2.9 | 5.4 | 5.6 | 2.3 |

Notes to Table One
(d) Samples were impacted using the instrumented falling weight impact test using a dart of 12.7 mm in diameter and with a 75 mm square specimen resting, unclamped, on a 50 mm diameter support ring. This test is described by C J Hooley and S Turner (Mechanical Testing of Plastics, Institute of Mechanical Engineers, June/July 1979, Automotive Engineer).
(e) Standard cooled refers to the sample cooled at about 15° C. per minute to about 80° C.
(f) Slow cooled refers to the sample cooled in the press overnight at 0.5° C./minute.
(g) Control is a laminate formed from APC 2, a composite material available from Imperial Chemical Industries PLC and based on a polyketone containing units I only.

(3) 40 thicknesses of the impregnated tapes, respectively from Example 1 and Example 2, were laid up such that the carbon fibres in each ply were oriented at 45° to those in the adjacent plies above and below. These laminates were slow cooled, as defined in Note (f) to Table One, and then subjected to various impacts, whereafter residual compression strength were determined in comparison with the control. The results are set out in Table Two.

TABLE TWO

| Sample | Impact (i) Energy (J/mm) | RCS (j) ($MN/m^2$) |
|---|---|---|
| Example 1 | 4.5 | 306 |
| | 6.7 | 239 |

TABLE TWO-continued

| Sample | Impact (i) Energy (J/mm) | RCS (j) (MN/m²) | | | |
|---|---|---|---|---|---|
| | 8.9 | | 242 | | |
| Example 2 | 4.5 | | 428 | | |
| | 6.7 | | 319 | | |
| | 9.0 | | 295 | | |
| Control (g) | 4.5 | slow | 283 | fast | 340 |
| | 6.7 | | 209 | | 298 |
| | 8.9 | | 160 | | 268 |

Notes to Table Two
(i) Samples were impacted using the instrumented falling weight impact test using a dart of 12.7 mm in diameter with a 150 mm × 100 mm specimen clamped in a rectangular support jig; the test otherwise is as defined in Note (d) to Table 1.
(j) RCS is residual compression strength and is determined by the technique described by B A Byers in NASA Contractor Report No 159293 of August 1980.

We claim:

1. A multiply quasi-isotropic laminate which has been formed under pressure and elevated temperature and then cooled, at a rate equal to or less than 5° C., per minute said laminate comprising a component (a) which is a polyetherketone or mixture of polyetherketones and a component (b) which is carbon fibre, said laminate having a residual compression strength of at least 290 MN/m² after being subjected to an impact of 4.5 J/mm, or of at least 220 MN/m² after being subjected to an impact of 8.9 J/mm, or both, said polyether ketone or polyether ketones consisting essentially of repeating units —O—PH—OPh—CO—Ph—  I and —O—Ph—Ph—O—Ph—CO—Ph—  II with components I and II being present in the relative molar proportions of 95:5 to 60:40 and the laminate contains 5 to 80% by weight, calculated on the total of (a) and (b), of the reinforcing agent (b), the laminate being characterized by improved damage tolerance on slow cooling when compared with a corresponding laminate wherein the polyketone contains only units I.

2. A laminate according to claim 1, wherein the laminate is formed at a temperature of at least 350° C. and an applied pressure of at least 0.1 MN/m² or by matched die forming at a temperature of at least 350° C. and an applied pressure of at least 5 MN/m² and the laminate formed is cooled at a rate of not more than 5° C. per minute.

3. In a multi-ply quasi-isotropic laminate comprising a component (a) which is a polyetherketone or mixture of polyetherketones, and a component (b) which is a carbon fibre reinforcing agent wherein the laminate is formed by heat fabrication followed by slow cooling at a rate equal to or less than 5° C. per minute, the damage resistance of said laminate being affected by slow cooling after said heat fabrication, the improvement which comprises using as component (a), a polyetherketone or mixture thereof consisting essentially of the repeating units —O—Ph—OPh—CO—PH—  I and —O—Ph—Ph—O—Ph—CO—Ph—  II wherein components I and II are present in the relative molar proportions I:II of 95:5 to 60:40 and said laminate contains 5 to 80% by weight, calculated on the total of (a) and (b), of the reinforcing agent, whereby said damage resistance is improved such that upon cooling after heat fabrication at a rate equal to or less than 5° C. min$^{-1}$, the laminate exhibits a residual compression of at least 290 MNm$^{-2}$ after being subjected to an impact of 4.5 J mm$^{-1}$.

4. A laminate according to claim 3, wherein component (a) is a single polyetherketone.

5. A laminate as claimed in claim 3, wherein said residual compression strength is at least 300 MNm$^{-2}$.

6. A laminate as claimed in claim 3, wherein said laminate has a residual compression strength of at least 220 MNm$^{-2}$ after being subjected to an impact of 8.9 Jm$^{-1}$.

* * * * *